United States Patent [19]
Ida

[11] Patent Number: 5,767,764
[45] Date of Patent: Jun. 16, 1998

[54] BINARY INFORMATION DISPLAY APPARATUS, LINEAR CAM FOR THE BINARY INFORMATION DISPLAY APPARATUS, AND METHOD OF GENERATING SHAPE PATTERNS OF THE LINEAR CAM

[75] Inventor: Takashi Ida, Omiya, Japan

[73] Assignee: Mitsubishi Materials Corporation, Tokyo, Japan

[21] Appl. No.: 551,714

[22] Filed: Nov. 1, 1995

[30] Foreign Application Priority Data

Nov. 1, 1994 [JP] Japan .................... 6-269102

[51] Int. Cl.$^6$ .................................................. H04B 3/36
[52] U.S. Cl. ................. 340/407.1; 434/112; 434/113; 434/114; 434/169
[58] Field of Search ..................... 340/407.1; 434/112, 434/113, 114, 169

[56] References Cited

U.S. PATENT DOCUMENTS 4,871,992  10/1989  Petersen .................... 340/407

5,453,012  9/1995  Hudecek .................... 434/114

FOREIGN PATENT DOCUMENTS

WO 92/15079  9/1992  Germany .................... 434/113

*Primary Examiner*—Jeffery Mofsass
*Assistant Examiner*—Julie B. Lieu
*Attorney, Agent, or Firm*—Anthony J. Casella; Gerald E. Hespos; Ludomir A. Budzyn

[57] ABSTRACT

There is provided a binary information display apparatus capable of generating all appearance/disappearance patterns of a plurality of corresponding braille pins, which binary information display apparatus is formed to be compact and has achieved improved response speed, a linear cam for the binary information display apparatus, and a method of generating shape patterns of the linear cam. Shape patterns determined by a predetermined shape pattern generation method are formed at pin interval L of the pins P1 to P4 on the top surface of a linear cam 5. When the linear cam 5 is moved at pin interval L in the direction of the arrow A, the appearance/disappearance pattern of the pins P1 to P4 on the display surface 1a changes, and all the appearance/disappearance patterns are generated with no duplication. That is, useless shape pattern is not present, and the total length of the linear cam 5 is shortened.

7 Claims, 9 Drawing Sheets

| | F1 | F2 | F3 | F4 | F5 | F6 | F7 | F8 | F9 | F10 | F11 | F12 | F13 | F14 | F15 | F16 |
|---|---|---|---|---|---|---|---|---|---|---|---|---|---|---|---|---|
| B1 | 0 | 0 | 0 | 0 | 1 | 1 | 0 | 1 | 0 | 0 | 1 | 0 | 1 | 1 | 1 | 1 |
| B2 | 0 | 0 | 0 | 1 | 1 | 0 | 1 | 0 | 0 | 1 | 0 | 1 | 1 | 1 | 1 | 0 |
| B3 | 0 | 0 | 1 | 1 | 0 | 1 | 0 | 0 | 1 | 0 | 1 | 1 | 1 | 1 | 0 | 0 |
| B4 | 0 | 1 | 1 | 0 | 1 | 0 | 0 | 1 | 0 | 1 | 1 | 1 | 1 | 0 | 0 | 0 |

|    | F1 | F2 | F3 | F4 | F5 | F6 | F7 | F8 | F9 | F10 | F11 | F12 | F13 | F14 | F15 | F16 |
|----|----|----|----|----|----|----|----|----|----|-----|-----|-----|-----|-----|-----|-----|
| B1 | 0  | 0  | 0  | 0  | 1  | 0  | 0  | 1  | 1  | 0   | 1   | 0   | 1   | 1   | 1   | 1   |
| B2 | 0  | 0  | 0  | 1  | 0  | 0  | 1  | 1  | 0  | 1   | 0   | 1   | 1   | 1   | 1   | 0   |
| B3 | 0  | 0  | 1  | 0  | 0  | 1  | 1  | 0  | 1  | 0   | 1   | 1   | 1   | 1   | 0   | 0   |
| B4 | 0  | 1  | 0  | 0  | 1  | 1  | 0  | 1  | 0  | 1   | 1   | 1   | 1   | 0   | 0   | 0   |

FIG. 5

|    | F1 | F2 | F3 | F4 | F5 | F6 | F7 | F8 | F9 | F10 | F11 | F12 | F13 | F14 | F15 | F16 |
|----|----|----|----|----|----|----|----|----|----|-----|-----|-----|-----|-----|-----|-----|
| B1 | 0  | 0  | 0  | 0  | 1  | 1  | 0  | 1  | 0  | 0   | 1   | 0   | 1   | 1   | 1   | 1   |
| B2 | 0  | 0  | 0  | 1  | 1  | 0  | 1  | 0  | 0  | 1   | 0   | 1   | 1   | 1   | 1   | 0   |
| B3 | 0  | 0  | 1  | 1  | 0  | 1  | 0  | 0  | 1  | 0   | 1   | 1   | 1   | 1   | 0   | 0   |
| B4 | 0  | 1  | 1  | 0  | 1  | 0  | 0  | 1  | 0  | 1   | 1   | 1   | 1   | 0   | 0   | 0   |

S10₁ (bracket over first portion), S10₂ (bracket over second portion)

BINARY INFORMATION DISPLAY APPARATUS, LINEAR CAM FOR THE BINARY INFORMATION DISPLAY APPARATUS, AND METHOD OF GENERATING SHAPE PATTERNS OF THE LINEAR CAM

BACKGROUND OF THE INVENTION

1. Field of the Invention

The present invention relates to a binary information display apparatus for displaying information, such as braille, which is displayed in binary notation, by making a plurality of pins arranged in parallel spaced relation appear or disappear individually. The invention also relates to a linear cam that is shaped so as to make it possible to change the state in which the pins appear or disappear. The invention further relates to a method of generating an optimum pattern for determining the shape of the linear cam.

2. Description of the Related Art

FIG. 9 is an illustration of a prior art binary display apparatus, and particularly a braille apparatus comprising a 4×2 array of dots. Referring to FIG. 9, reference characters P1 to P8 denote braille pins provided at four lines and two rows; reference numeral 1 denotes a support member for slidably supporting the braille pins P1 to P8; reference numeral 2 denotes a nearly rectangular linear cam having projection and recess patterns formed on the top surface thereof; and reference numeral 3 denotes a stepping motor having a shaft 3a. A corresponding thread groove is formed in the linear cam 2 and the shaft 3a, and as the stepping motor 3 is driven, the linear cam 2 is linearly moved parallel to the shaft. In the rear portion, a linear cam having the same shape as the linear cam 2 and a stepping motor (both of which are not shown) are provided, and the same operation is performed.

FIGS. 10(a) and 10(b) are illustrations of the shape of the linear cam 2, and the state of pins P1 to P4 at this time. In the linear cam 2 shown in FIG. 10(a), projections or recesses having a predetermined height are formed at pin interval L. The braille pins P1 and P2 corresponding to recesses 2a and 2b of the linear cam 2 descend, and braille pins P3 and P4 corresponding to recesses 2c and 2d project from a display surface 1a. As a result, a binary display of "0011" is made, and when the linear cam 2 is moved by pin interval L in the direction of the arrow A, "0110" is displayed as shown in FIG. 10(b).

In this way, by making the linear cam 2 move in units of pin interval L, the appearance/disappearance pattern of the pins P1 to P4 changes, and in a similar manner, the appearance/disappearance pattern of the braille pins P5 to P8 changes by the linear cam (not shown).

PROBLEM TO BE SOLVED BY THE INVENTION

There are 16 types of patterns capable of displaying 4-bit binary numbers as the appearance/disappearance pattern of the braille pins P3 and P4 described above. Projections and recess patterns capable of generating all of these appearance/disappearance patterns must be formed in the linear cam 2.

However, when 16 types of patterns are connected simply in one row, the length of the pattern is 64, and the total length of the linear cam is 64×L. When the total length of the linear cam becomes long, the weight of the linear cam increases, and problems described below arise.

Frictional resistance and response time both increase as the distance moved by the linear cam long and as the weight increases. Also, the prior art braille apparatus having the linear cam is inconveniently large and heavy.

Accordingly, it is an object of the present invention to provide a binary information display apparatus capable of generating all the appearance/disappearance patterns of a plurality of pins and which can be small in size and light in weight, a linear cam for use in the apparatus, whose total length is shortened, and a method of generating an optimum shape pattern for determining the shape of the linear cam.

SUMMARY OF THE INVENTION

The present invention is directed to a pattern generation method of generating an optimum pattern used for determining the shape of a linear cam for making n pins appear or disappear at the same time as a result of the linear movement of the linear cam along the arrangement of the pins. The linear cam is used in a binary information display apparatus in which n pins arranged in series are made to appear or disappear from a display surface by means of the linear cam, and n bit information is displayed on the basis of the appearance/disappearance pattern of the pins. The method comprises a first step of initializing n-bit information and a phase number. The method proceeds with a second step of shifting pattern information by one bit and setting "1" or "0" on the final bit of the pattern information, and thus creating new phase information which does not correspond to any pattern information which has already been obtained. A third step of the method includes setting information different from the information set in the second step at the final bit of the pattern information, and thus creating new phase information which does not correspond to any pattern information which has already been obtained. A fourth step of the method involves repeating the above steps while the phase number is updated and creating a plurality of types of shape patterns from predetermined bits of each of a plurality of pattern information obtained as a result of the above steps.

According to a second aspect of the present invention, in the first aspect of the present invention, each of a plurality of types of shape patterns obtained in the fourth step is divided into two parts, and one of the divided two patterns is superimposed upon another with the phase shifted by ½ in order to obtain a new shape pattern.

According to a third aspect of the present invention, in the first aspect of the present invention, a pattern is selected from a plurality of shape patterns obtained in the fourth step, such that the total number of changes in the adjacent binary information is small and the number of binary information corresponding to the projection of the linear cam is small.

According to a fourth aspect of the present invention, in the second aspect of the present invention, a pattern is selected from a plurality of shape patterns obtained in the fifth step, such that the total number of changes in the adjacent binary information is small and the number of binary information corresponding to the projection of the linear cam is small.

According to a fifth aspect of the present invention, the projection and recess shape corresponding to the shape pattern obtained by the method in accordance with the second or fourth aspect of the present invention is formed at an interval of one half of the pin interval of the n pins.

According to a sixth aspect of the present invention, a binary information display apparatus having a linear cam in accordance with the fifth aspect of the present invention is provided.

According to the first aspect of the present invention, phases are shifted in sequence in correspondence with the phase number, all possible types of a sequence of pattern information, which are not redundant, are formed, and a shape pattern for determining the projection and recess shape of the linear cam is created for each of the types. The linear cam in which the projection and recess shape corresponding to the shape pattern is formed at intervals of the pins is able to generate all the appearance/disappearance states of a plurality of pins by a minimum necessary movement.

According to the second aspect of the present invention, a new shape pattern such that the divided patterns are superimposed on each other at ½ phase is obtained in each of a plurality of types of shape patterns obtained in accordance with the first aspect of the present invention. When a projection and recess shape corresponding to this new shape pattern is formed in the linear cam at an interval of one half of the above described pin intervals, it is possible to make the total length of the linear cam to about one half.

The linear cam having a projection and recess pattern formed in correspondence with the shape pattern selected in accordance with the third or fourth aspect of the present invention has a shape having a small number of projections and a small amount of changes in the projections and recesses. Therefore, a linear cam which is even more light in weight and has a small amount of resistance of friction with the pins when the linear cam is moved can be obtained.

BRIEF DESCRIPTION OF THE DRAWINGS

FIG. 5 is an illustration of phase sequences obtained by the process of FIGS. 3 and 4.

FIG. 7 is a first illustration of a method of determining the shape in FIG. 6.

FIGS. 8(a) and 8(b) are additional illustrations of a method of determining the shape in FIG. 6.

DETAILED DESCRIPTION OF THE PREFERRED EMBODIMENTS

Figures 1, 2:
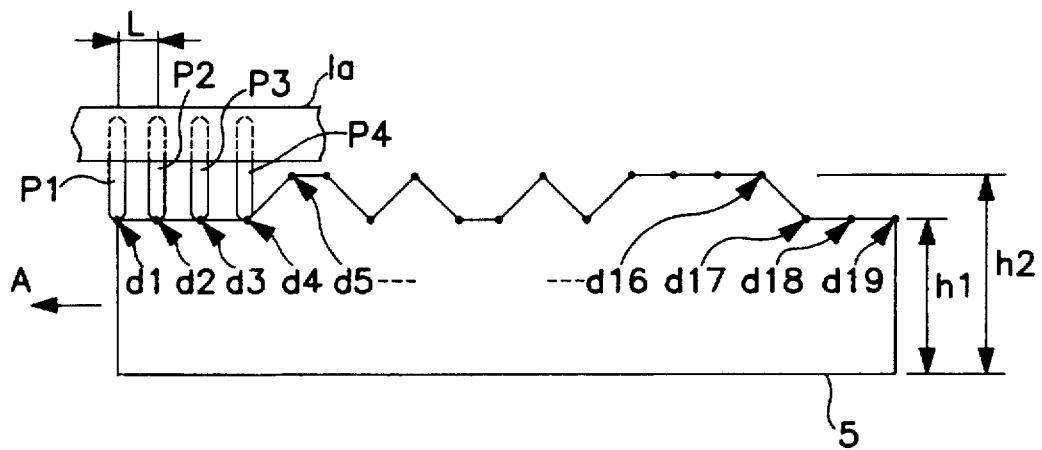
FIG. 1 shows the shape of a linear cam 5 in accordance with a first embodiment.
FIG. 2 shows patterns (B1 to B4) displayed in each phase (F1 to F16) of the linear cam 5 of FIG. 1.
Figure 9:
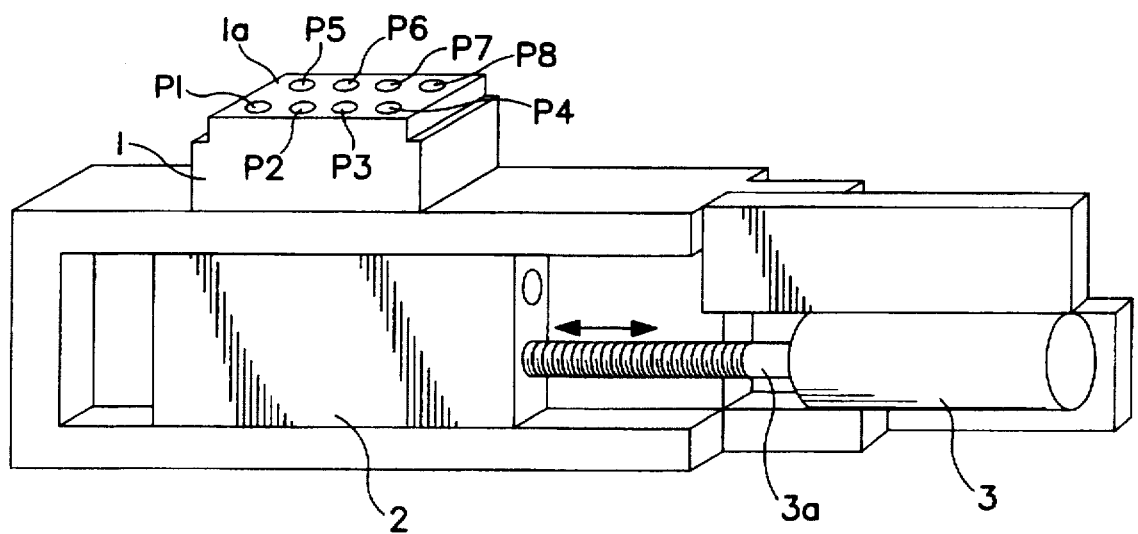
FIG. 9 shows the construction of a prior art braille apparatus having a linear cam.
Figure 10A:
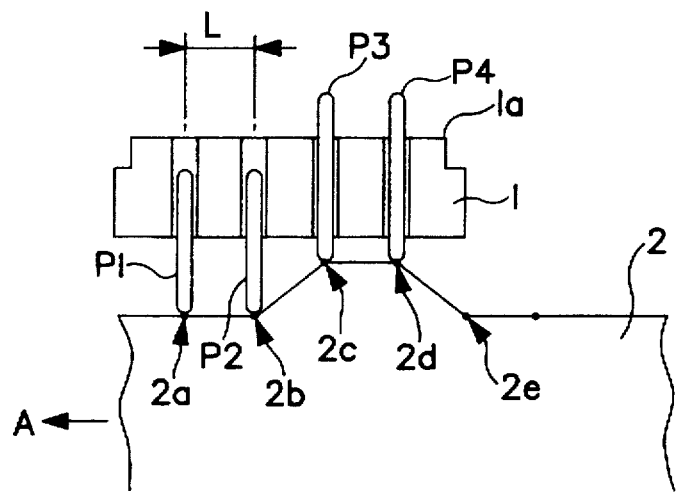
FIGS. 10(a) and 10(b) show the relationship between the shape of a linear cam 2 of FIG. 9 and braille pins P1 to P4.
Figure 10B:
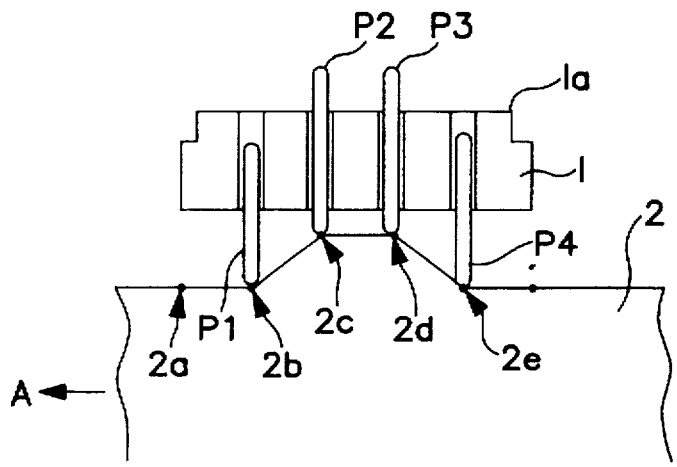

FIG. 1. shows the shape of a linear cam 5 in accordance with a first embodiment of the present invention, and the essential portion of a corresponding braille apparatus (see FIG. 9). The components in FIG. 1 which correspond to those in FIG. 9 are given the same reference numerals, and an explanation thereof is omitted.

Referring to FIG. 1, reference characters d1, d2, . . . d19 denote display points which have a height of either h1 or h2 (h2>h1) and set at the same interval as each interval L of the braille pins P3 and P4. The shape obtained by connecting these continuous display points d1, d2, . . . d19 by straight lines is a projection and recess pattern formed on the top surface of a linear cam 5. As a result of the above, the position of the pin can be moved smoothly from a recess to a projection, and vice versa by the linear movement of the linear cam 5.

The pins P1 to P4 are positioned on the continuous four display points. When the height of the corresponding display point is h2, the pin projects from the display surface 1a, and "1" is displayed; when the height of the corresponding display point is h1, the pin descends, and "0" is displayed. In this way, a display pattern is determined in accordance with the projection or descent of the braille pins P1 to P4.

Here, if the current phase of the linear cam 5 shown in FIG. 1 is denoted as F1, the phase after the linear cam 5 is linearly moved by the pin interval L in the direction of the arrow A as F2, and phases when the linear cam 5 is moved in units of pin interval L as F3, F4, . . . F16 in a similar manner, each of the phases F1 to F16 has a correspondence with the display patterns B1 to B4 as shown in FIG. 2 (hereinafter referred to as a "phase sequence").

As can be seen in FIG. 2, at phases F1 to F16, all patterns which can be represented by four bits are shown, and no duplicate pattern is present. That is, a different display is made each time the linear cam 5 is moved in units of pin interval L, and all the patterns are displayed.

Figure 3:
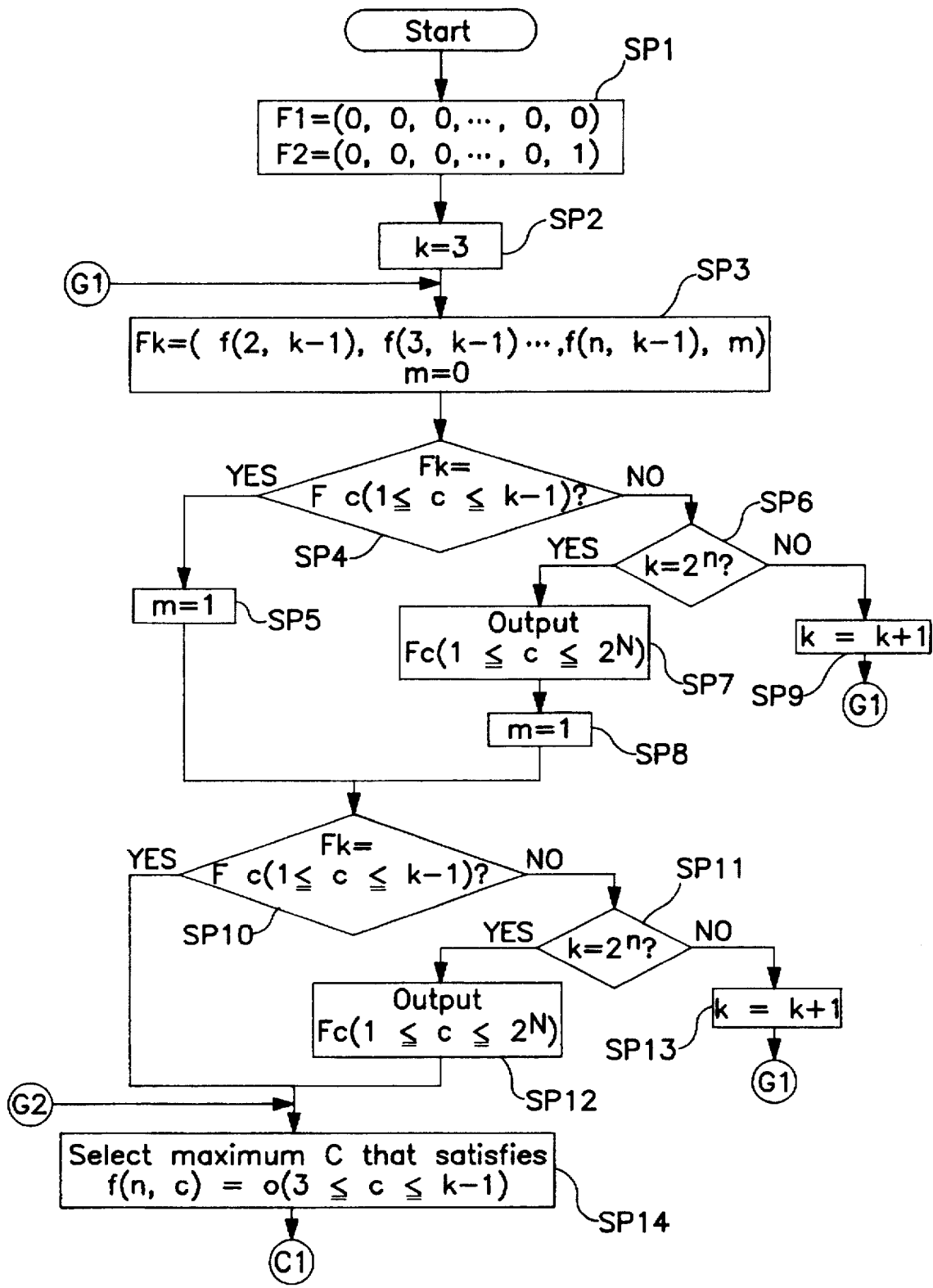
FIG. 3 is a flowchart illustrating a method of creating a phase sequence (FIG. 2).
Figure 4:
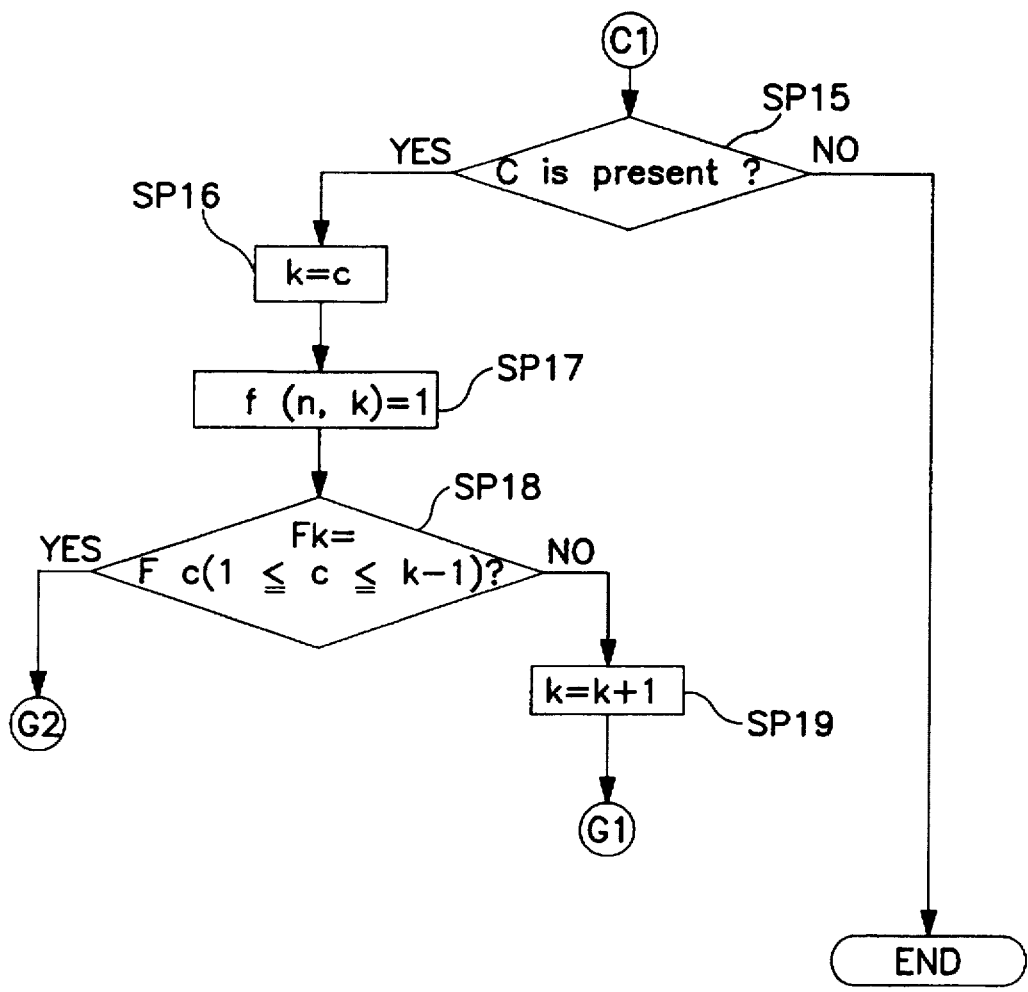
FIG. 4 is a flowchart which continues from FIG. 3.

The display points d1, d2, . . . d19 which form the above described projection and recess pattern of the linear cam 5 are, in practice, determined on the basis of the phase sequence shown in FIG. 2. A method of generating a phase sequence will be described below with reference to FIGS. 3 and 4. Here, a display point having a height h1 is denoted as "0" and a display point having a height h2 as "1", and a case in which there are n braille pins will be described. Further, the k-th phase is represented by the following equation:

$$Fk = (f(1,k), f(2,k), f(3,k), \ldots, f(n,k)).$$

Initially, in step SP1 (see FIG. 3), first phase F1 is initialized (set to all "0") and second phase F2 is initialized (set to all "0" except the final bit which is set to "1"). In step SP2, the phase number k is set at "3".

In step SP3, each bit f(i,j) of the k−1)-th phase is shifted by one bit, and the final bit m is temporarily set to "0" to obtain the k-th phase Fk. The phase Fk thus obtained is compared in step SP4 with all the phases Fc ($1 \leq c \leq k-1$) which have already been set. When there is a matching phase, the final bit m is reset to "1", and the process proceeds to step SP10 which will be described later. When there is no matching phase, the process proceeds to step SP6 where a check is made to determine if phase Fk is the final phase ($k=2^n$). When phase Fk is not the final phase, the phase number k is updated in step SP9, and the process returns to step SP3 described above.

In step SP10, the same comparison as in step SP4 described above is performed. When there is a matching phase, the process proceeds to step SP14; when there is not a matching phase, a check is made to determine if phase Fk is the final phase. When phase Fk is not the final phase, the phase number k is updated, and the process returns to step SP3 described above (steps SP11 and SP13).

When the final phase is set in the above process, all the phases F2 to F2$^n$ obtained are output as phase sequences in step SP7 or SP12. FIG. 5 shows the first phase sequence obtained when the number n of braille pins is 4.

On the other hand, when there is a previous matched phase even if m is set at either "0" or "1", that is, when both steps SP4 and SP10 are "yes", the process proceeds to step SP14 to be described next. Since there is always a matching phase in the phase in which m=1 is set in step SP8 after the phase sequence is output in step SP7 described above, the process similarly proceeds to step SP14.

In step SP14, a maximum c that satisfies f(n,c) is selected from among the phases which have already been set. A check is made in step SP15 (see FIG. 4) to determine if there is c in this selection. When there is c, the selected c is set to the phase number k, and f(n,k) is set to "1" (steps SP16 and SP17). The phase Fk obtained by this setting is compared with all the phases Fc which have previously been set in step SP18. When there is no matching phase, the phase number k is updated (step SP19), and the process returns to step SP3 described above. When there is a matching phase, the process returns to step SP14, and the above described processes are repeated.

When there is no c in step SP15, all the phase sequences are obtained, and the process is terminated.

Each of all the phase sequences thus obtained represents all the patterns, and each is an optimization phase sequence which is not a duplicate.

There are a total of 16 types of phase sequences obtained when the number n of braille pins is 4, including the above described phase sequence of FIG. 5. The optimization pattern S1 is obtained from each bit surrounded by the dotted line of FIG. 5.

S1—"0000100110101111000"

Similarly, optimization patterns S2 to S16 described below are obtained from the other phase sequences.

S2="0000100111101011000"
S3="0000101001101111000"
S4="0000101001111011000"
S5="0000101100111101000"
S6="0000101101001111000"
S7="0000101111001101000"
S8="0000101111010011000"
S9="0000110010111101000"
S10="0000110100101111000"
S11="0000110101111001000"
S12="0000110111100101000"
S13="0000111100101101000"
S14="0000111101001011000"
S15="0000111101011001000"
S16="0000111101100101000"

The optimum pattern which corresponds to pattern S10 from among the optimum patterns is a phase sequence of FIG. 2, and the display points d1, d2, . . . d19 of the linear cam 5 (see FIG. 1) are determined on the basis of the optimum pattern.

By shifting the optimized phase sequence F1 to F16 shown in FIG. 2, a new phase sequence can be created. For example, the optimization pattern S10' obtained when the phases are shifted as F3, F4, F5, . . . , F16, F1, and F2 is as shown below.

S10'="0011010010111100001"

In this way, a total of 16 types of optimization phase sequences are obtained from one optimization phase sequence. As a result, 16 types of optimization patterns are obtained. That is, when there are n display pins, $2^y$ (where $y=2^{(n-1)}$) types of optimization phase sequences and corresponding optimization patterns are obtained.

Since the projection and recess patterns of the linear cam 5 are determined by the method described above, it is possible to shorten the total length of the linear cam 5, and to make the apparatus compact and light in weight. Further, the movement distance between the phases is shortened, and responsivity of pattern switching is improved.

The pin interval L of the pins P1 to P4 described in the first embodiment is generally 2.4 mm in the case of a braille apparatus. When projection and recess patterns are formed in the linear cam 5 in accordance with that interval, the gradient thereof is gentle more than necessary. Therefore, a second embodiment of the present invention is concerned with a case in which the projection and recess pitches are one half of the pin interval L.

Figure 6A:
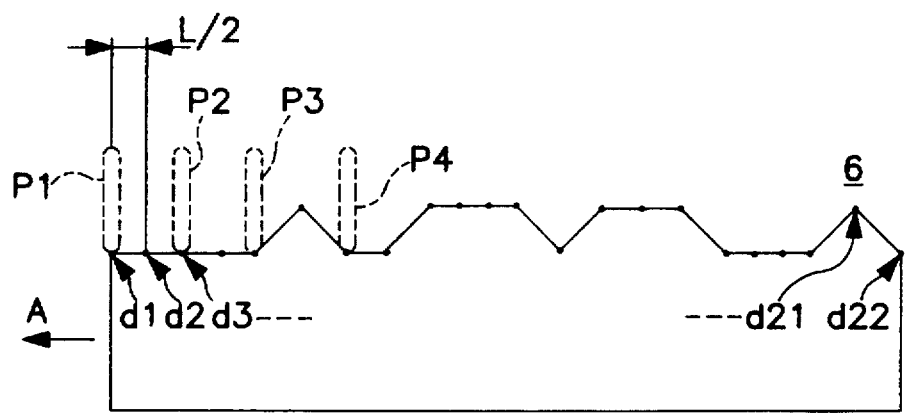
FIGS. 6(a) and 6(b) show the shape of the half-pitch linear cam 6 in accordance with a second embodiment.

FIG. 6(a) shows the shape of a half-pitch linear cam 6 in accordance with this embodiment. Display points d1 to d22 having a predetermined height are set at an interval L/2 on the top surface of the linear cam 6 of FIG. 6(a), and projection and recess patterns are formed. FIG. 8(b) shows a state in which the linear cam 6 is moved by interval L/2 in the direction of the arrow A. Each time the linear cam 6 is moved by interval L/2, a different display is made by the display pins P1 to P4.

A method of determining the projection and recess patterns of the half-pitch linear cam 6 will be described below with reference to FIGS. 7 and 8.

Initially, the phase sequence obtained by the method of the first embodiment is divided into two parts, and two patterns are created from each divided phase sequence. Then, the two patterns are superimposed on one another, every other bit of the two patterns obtained by division. As a result, a half-pitch optimum pattern is obtained.

To describe in more detail, in the case of the phase sequence of FIG. 2, the phase sequence is divided as shown in FIG. 7, and two patterns surrounded by the dashed line are obtained. That is, as shown in FIG. 8(a), patterns S101 and S102 are created from the optimization pattern S10.

S101="00001101001"
S102="00101111000"

Next, as shown in FIG. 8(b), pattern S102 is shifted by ½ phase with respect to pattern S101, patterns S101 and S102 are superimposed on one another, and a half-pitch optimum pattern S103 is obtained.

S103="000001001111011000010"

Figure 6B:
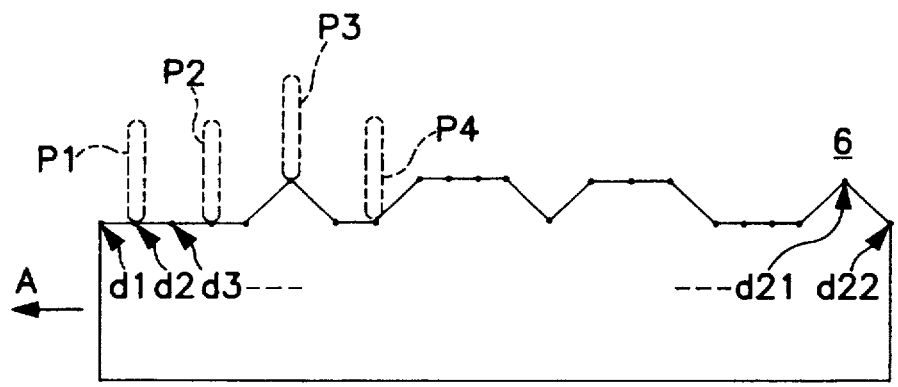

The display points d1 to d22 are determined on the basis of this half-pitch optimum pattern, and the projection and recess patterns of the half-pitch linear cam 6 shown in FIG. 6 are determined. When the half-pitch linear cam 6 is moved in sequence at an interval of L/2 in the direction of the arrow A, all the display patterns which can be represented by four bits are displayed with no duplication by the pins P1 to P4.

Also, it is possible to create a half-pitch optimum pattern by the same method from the optimum pattern obtained from the other phase sequences described in the first embodiment and the phase sequences obtained by shifting the former phase sequences. Therefore, it is possible to obtain 16 types of half-pitch optimum patterns from one optimized phase sequence.

According to the second embodiment described above, it is possible to shorten the total length of the half-pitch linear cam 6 to one half of the linear cam 5 of the first embodiment, and thus an even more compact and lighter-weight apparatus can be realized, and improved response can be achieved.

Next, a method of selecting a more preferable pattern from a plurality of half-pitch optimum patterns obtained by the above described method will be described.

First, two adjacent bits of the continuous bit train of the half-pitch optimum patterns are compared with each other, and the number of mismatches is counted. As a result, the number Q of cases where the pattern changes from "0" to "1" or from "1" to "0" is obtained. The number Q of changes is checked for all the half-pitch optimum patterns, and the half-pitch optimum pattern having the minimum number Q of changes is selected.

In a case where the projection and recess patterns of the linear cam are formed by the half-pitch optimum patterns selected in this way, the number of times that the braille pins P1 to P4 appear or disappear when the linear cam is moved in Qmin, which is smaller than the number of times for the other patterns. That is, the wear of the braille pins and each part in contact with these pins when the linear cam is moved is reduced.

Further, the total number R of bit "1" is counted for each half-pitch optimum pattern having the number Qmin of changes, and the pattern such that the total number R is a minimum is selected. When the projection and recess patterns of the linear cam are formed by the half-pitch optimum patterns selected in this way, since the number of projections of the linear cam is reduced, the volume of the linear cam is reduced, and the weight thereof is reduced in comparison with the case of the other cases.

As described above, since a half-pitch optimum pattern is selected by the above described method, a half-pitch linear cam having a small amount of friction and light weight is realized.

The optimum pattern and the half-pitch optimum pattern of the linear cam described in the first and second embodiments are only an example. In addition to this example, an optimum pattern can be obtained by the above described method.

Although the above described embodiments describe a case in which a display is made is binary notation by four braille pins P1 to P4, it is possible to generate an optimum pattern and a half-pitch optimum pattern by the above described method even when the number of braille pins is more than or less than four.

The projection and recess shape formed in the linear cam based on the optimum pattern is not limited to the shape described above. For example, projections and recesses may be formed by a curve.

As has been described up to this point, according to the present invention, advantages can be obtained that the total length of the linear cam can be reduced greatly, and therefore the apparatus in which the linear cam is incorporated can be made compact and light in weight, and the response speed when the pattern is switched is improved.

What is claimed is:

1. A method of generating an optimum binary pattern corresponding to an optimum disposition of projections and recesses on a linear cam, said linear cam being used in a binary information display apparatus in which n pins, arranged in series, are made to selectively appear and disappear from a display surface by moving the linear cam, such that a plurality of different phases of n-bit information are displayed as patterns of "1" and "0"s on the basis of appearance/disappearance patterns of the pins produced by the projections and recesses on the linear cam, said method comprising:

a first step of initializing the pattern of n-bit information to all "0"s and initializing a phase number to k=1;

a second step of shifting the pattern of n-bit information by one bit to establish a new final bit of the pattern of information and setting "1" or "0" on the final bit of the pattern of information, and thus creating new phase k=k+1 if the pattern of n-bit information does not correspond to any said pattern of n-bit information which has already been obtained;

a third step of setting information different from the information set in said second step at the final bit of the n-bit pattern information, and thus creating new phase k=k+1 if the pattern of n-bit information does not correspond to any said pattern of n-bit information which has already been obtained; and a fourth step of repeating the second and third steps for creating a selected plurality of phases defining different patterns of n-bit information.

2. A method according to claim 1, further comprising:

a fifth step of dividing the plurality of patterns of n-bit information obtained in said fourth step into two parts, and superimposing one of the divided two patterns upon another with the phase shifted by ½.

3. A method according to claim 1, wherein at least one pattern is selected from the plurality of patterns obtained in the fourth step, such that the total number of changes in adjacent binary information is small and the number of binary information corresponding to the projections of the linear cam is small.

4. A method according to claim 2, wherein at least one pattern is selected from the plurality of patterns obtained in the fifth step, such that the total number of changes in the adjacent binary information is small and the number of binary information corresponding to the projections of the linear cam is small.

5. A linear cam for a binary information display apparatus, wherein the projection and recess shape corresponding to the shape pattern obtained by the method claimed in claim 2 is formed at an interval of one half of the pin interval of said n pins.

6. A binary information display apparatus comprising a linear cam claimed in claim 5.

7. A method according to claim 1, wherein the second and third steps are repeated sufficiently for creating $2^n$ phases.

* * * * *